United States Patent [19]

Bollmer

[11] 4,021,909

[45] May 10, 1977

[54] HAND PORTABLE DEVICE FOR FASTENING A HOLDING BAR ON A PRINTING BLANKET AND METHOD OF FASTENING SAME

[75] Inventor: Jacob A. Bollmer, Dayton, Ohio

[73] Assignee: Dayco Corporation, Dayton, Ohio

[22] Filed: Feb. 13, 1976

[21] Appl. No.: 657,912

[52] U.S. Cl. .......................... 29/432.1; 29/243.58; 29/509

[51] Int. Cl.$^2$ .................. B23P 11/00; B25B 25/00; B25B 27/02

[58] Field of Search ................ 29/432.1, 513, 514, 29/521, 243.58, 243.57, 243.5, 256, 270, 509

[56] References Cited

UNITED STATES PATENTS

| | | | |
|---|---|---|---|
| 328,615 | 10/1885 | Reynolds | 29/243.57 |
| 1,135,469 | 4/1915 | Sutherland et al. | 29/243.58 |
| 1,743,477 | 1/1930 | Perkins | 29/243.58 |
| 2,574,509 | 11/1951 | Stuart | 29/243.58 |
| 3,197,860 | 8/1965 | Gracer | 29/514 |
| 3,278,880 | 10/1966 | Lewis et al. | 29/513 |
| 3,680,346 | 8/1972 | Wilcox | 29/243.58 |
| 3,824,757 | 7/1974 | Coop | 29/513 |

*Primary Examiner*—C.W. Lanham
*Assistant Examiner*—Daniel C. Crane
*Attorney, Agent, or Firm*—Reuben Wolk

[57] ABSTRACT

A hand portable device for fastening a holding bar on a printing blanket and method of fastening such holding bar is provided and the device employs cooperating rollers to urge portions of such holding bar in clamping engagement against opposed surfaces of the blanket.

17 Claims, 6 Drawing Figures

HAND PORTABLE DEVICE FOR FASTENING A HOLDING BAR ON A PRINTING BLANKET AND METHOD OF FASTENING SAME

BACKGROUND OF THE INVENTION

Bars for holding printing blankets on a printing press are in wide use throughout industry. In general, these holding bars are usually fastened in position utilizing massive presses, with the resultant high cost due to time spent on an expensive piece of equipment to perform the fastening function.

SUMMARY

It is a feature of this invention to provide a simple and inexpensive hand portable device for fastening a holding bar on a printing blanket.

Another feature of this invention is the provision of a simple and economical method of fastening a holding bar on a printing blanket.

Another feature of this invention is the provision of a hand portable device for fastening a holding bar on a printing blanket with the holding bar having a bight and a pair of legs diverging from opposite ends of the bight and the device having a frame structure, a backup roller rotatably mounted on the frame structure, and a pressure roller carried by the frame structure for rotation relative thereto in spaced relation from the backup roller. The device has provision for adjusting the spacing between the pressure roller and backup roller and means for relatively moving the device and bar with the pressure roller relatively urging the legs of the bar toward each other with the end portion of the blanket disposed between such legs to thereby progressively deform at least one of the legs along its entire length and into clamping engagement against the end portion of the blanket disposed therebetween.

Accordingly, it is an object of this invention to provide a hand portable device for fastening a holding bar on a printing blanket and method of fastening such a holding bar having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
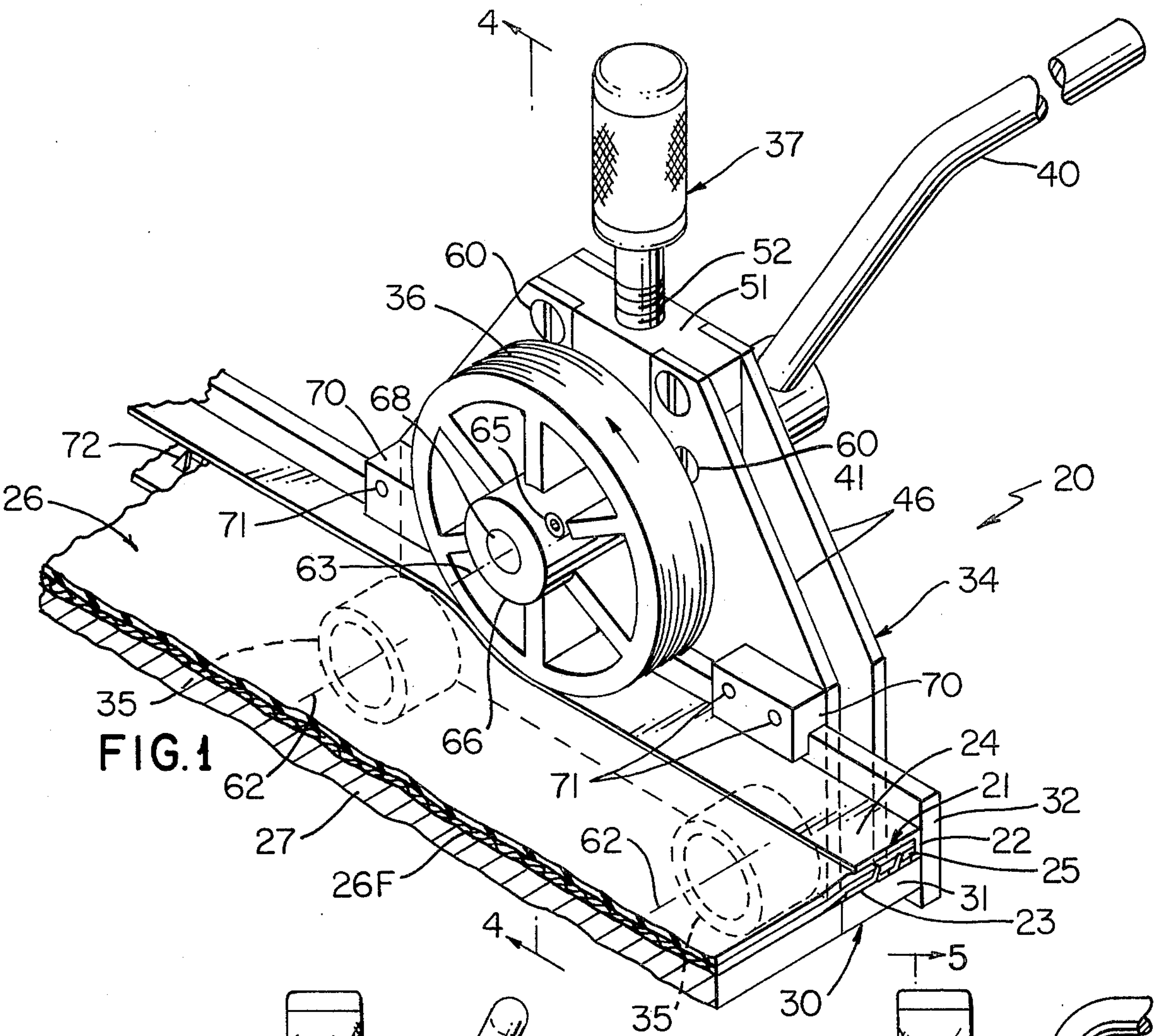
FIG. 1 is a perspective view with parts in cross section, parts in elevation, and parts broken away illustrating one exemplary embodiment of a hand portable printing blanket holding bar fastening device of this invention and method of this invention of fastening a holding bar on a printing blanket showing such holding bar being fastened in position at one end portion of a blanket.

Reference is now made to FIG. 1 of the drawings which illustrates one exemplary embodiment of a hand portable device for fastening a holding bar on a printing blanket and a method of fastening same wherein the device and method are designated generally by the reference numeral 20. The holding bar in this example is designated generally by the reference numeral 21 and has a bight 22 and a pair of legs 23 and 24 diverging from opposite ends of the bight 22 with the holding bar 21 of this example being a single piece structure.

The holding bar 21 is particularly adapted to receive an end portion 25 of a printing blanket 26 between the legs 23 and 24 thereof and in using the device and practicing the method of this invention the blanket is preferably supported on a horizontal table 27 which has a T-shaped rail structure 30 fixed thereto. The rail structure 30 has a main portion 31 and a crossarm 32 in the form of a guide plate 32 and such guide plate may be fixed to the main portion by threaded screws, welding or other suitable means. The crossarm or plate 32 is disposed vertically and for a purpose to be described later in this specification.

The device 20 is comprised of a frame structure 34 which has a plurality of backup rollers each designated by the same reference numeral 35 rotatably mounted on the frame structure and in a manner to be described in detail subsequently and a pressure roller 36 carried by the frame structure for rotation relative thereto. The pressure roller 36 is arranged in spaced relation from the backup rollers 35 and in this example the roller 36 is disposed in vertically spaced relation above such rollers with the device 20 in operative association for fastening the bar 21 on the end portion 25 of the printing blanket 26.

The device 20 has means for adjusting the spacing between the pressure roller and the backup rollers 35 and in this example such means is designated generally by the reference numeral 37; and, such device also has means, shown in this example as a hand crank 40, for relatively moving the device and bar with the pressure roller relatively urging the legs 23 and 24 toward each other and with the end portion 25 of the blanket disposed between such legs to thereby progressively deform at least one of the legs along its entire length into clamping engagement against the end portion 25 of the blanket.

In this example of the invention, the pressure roller 36 has an outside cylindrical surface 41 which engages the upper leg 24 of the holding bar 21. The pressure roller 36 deforms the leg 24 along its entire length by urging such leg toward the opposed leg 23 which is supported in a fixed horizontal position by the rail 30. In particular, as the roller 36 moves along the rail 30, it, in essence, provides a progessive transverse (perpendicular in this example) line deformation of the leg 24 along its entire length. This line deformation is a progressive movement of the line of deformation and requires comparatively little force to achieve because of the small area being deformed as the roller 36 moves along the leg 24. Nevertheless, the leg 24 is deformed and compressed tightly against the end portion 25 of the printing blanket 26 to compress and sandwich such blanket tightly between the legs 23 and 24. If desired, the adjusting means 37 may be employed to change the vertical spacing between roller 36 and a horizontal plane engaging the top outside cylindrical surfaces of the substantially identical rollers 35 to further deform the leg 24 against the end portion 25 for a tighter hold.

Figure 5:
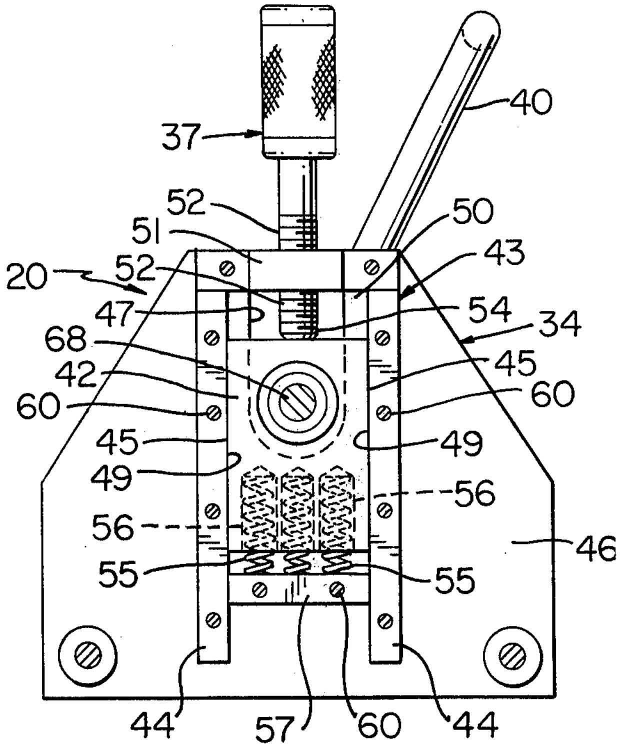
FIG. 5 is a view taken essentially on the line 5—5 of FIG. 3.

Referring now to FIG. 5 of the drawings, it will be seen that the device 20 comprises a carrier 42 which rotatably supports the pressure roller 36 and the device 20 has means designated generally by the reference numeral 43 supporting the carrier 42 and pressure roller 36 for sliding movement toward and away from backup rollers 35. In particular, it will be seen that the supporting means 43 is defined by a pair of vertically disposed slide rails 44 which are arranged in spaced relation and receive opposed edges 45 of the carrier 42 therebetween for sliding movement therealong; and, it will be seen that the frame structure 34 is comprised of a pair of spaced plates each designated by the same reference numeral 46.

Each plate 46 has a central cutout 47 and each plate has opposed side portions 50 adjoining each cutout 47. The side portions 50 of each plate cooperate with inside surfaces 49 of the vertical slide rails 44 to support and confine the carrier 42 for sliding movement toward and away from the backup rollers 35.

The adjusting means 37 for the device 20 is an adjustable stop 37 in the form of a stop screw 37 which is threadedly received in the frame structure and in particular in an upper member 51 of the frame structure 34 and the stop screw 37 has a threaded portion 52 threadedly received in the member 51 and has an exposed end portion 54 which is adapted to be engaged by the carrier 42 to limit the movement thereof away from the backup rollers 35.

As seen in FIG. 5, the device 20 further comprises means yieldingly urging the carrier 42 against the adjustable stop and in particular against the exposed end portion 54 of the threaded stop screw 37 and such means yieldingly urging is in the form of mechanical spring means shown as a plurality of three compression springs 55. The springs 55 are disposed within the corresponding plurality of three openings 56 provided in the carrier 42 and have bottom portions which engage a transverse bar member 57 of the frame structure 34.

The member 57 as well as the members 44 and 51 are fixedly held in position between the plates 46 of the frame structure 34 by a plurality of threaded screws, a representative few of which are designated by the same reference numeral 60. Each screw 60 of the device 20 of this invention extends through associated openings in its associated component portions and is threadedly received in a threaded opening in the rearmost plate 46 or the plate 46 which is disposed in a remote position from the pressure roller 36.

Figure 2:
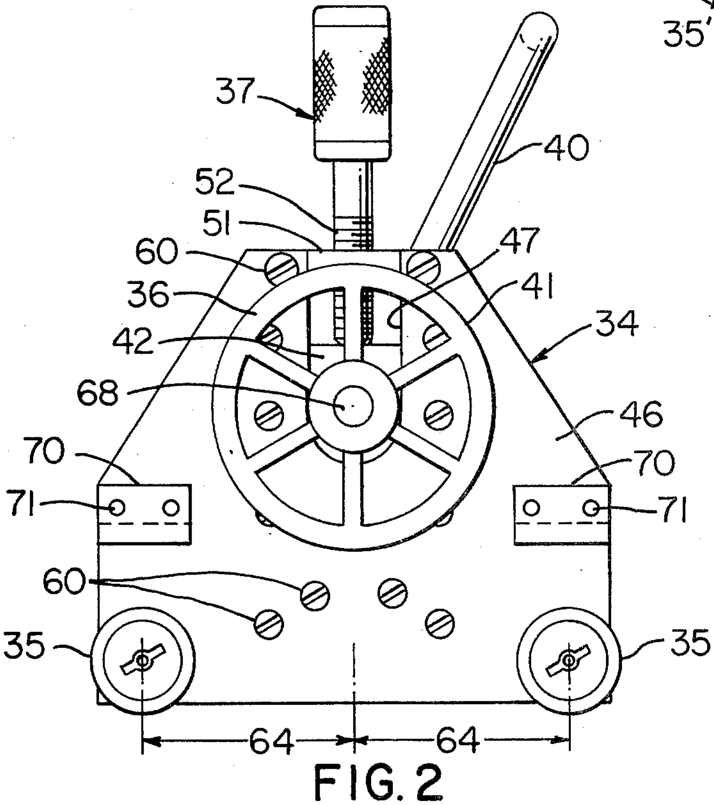
FIG. 2 is a front view of the device of FIG. 1 minus the printing blanket, holding bar, and support table associated therewith.
Figure 3:
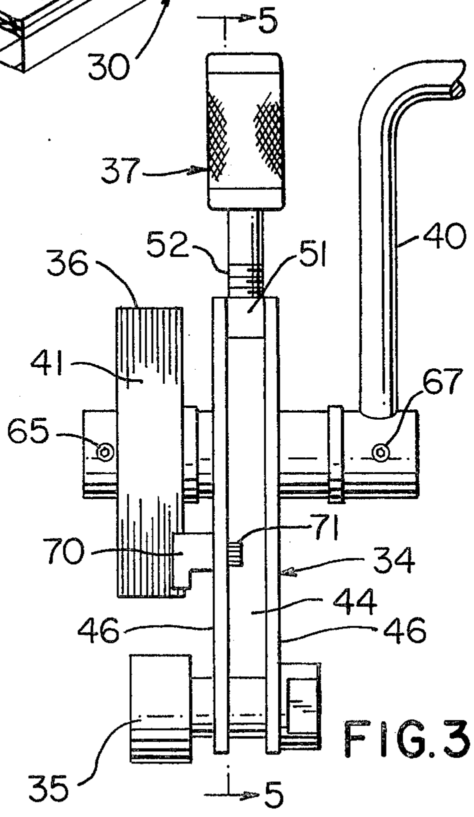
FIG. 3 is a side view of the device of FIG. 2 with a portion of such device broken away.

As previously mentioned above, the device 20 has a plurality of two backup rollers 35 and these backup rollers have their axes, each designated by the same reference numeral 62, arranged in a common plane and it will be seen that the means 43 for supporting the carrier 42 for movement toward and away from the backup rollers 35 supports such carrier 42 for movement perpendicular to the plane containing the axes 62 of the backup rollers 35. It will also be seen that the backup rollers have their axes 62 disposed in the previously mentioned common plane an equal distance 64 from a plane perpendicular thereto which contains the axis 63 of the pressure roller 36 and such equal distance is indicated in FIG. 2.

Figure 4:
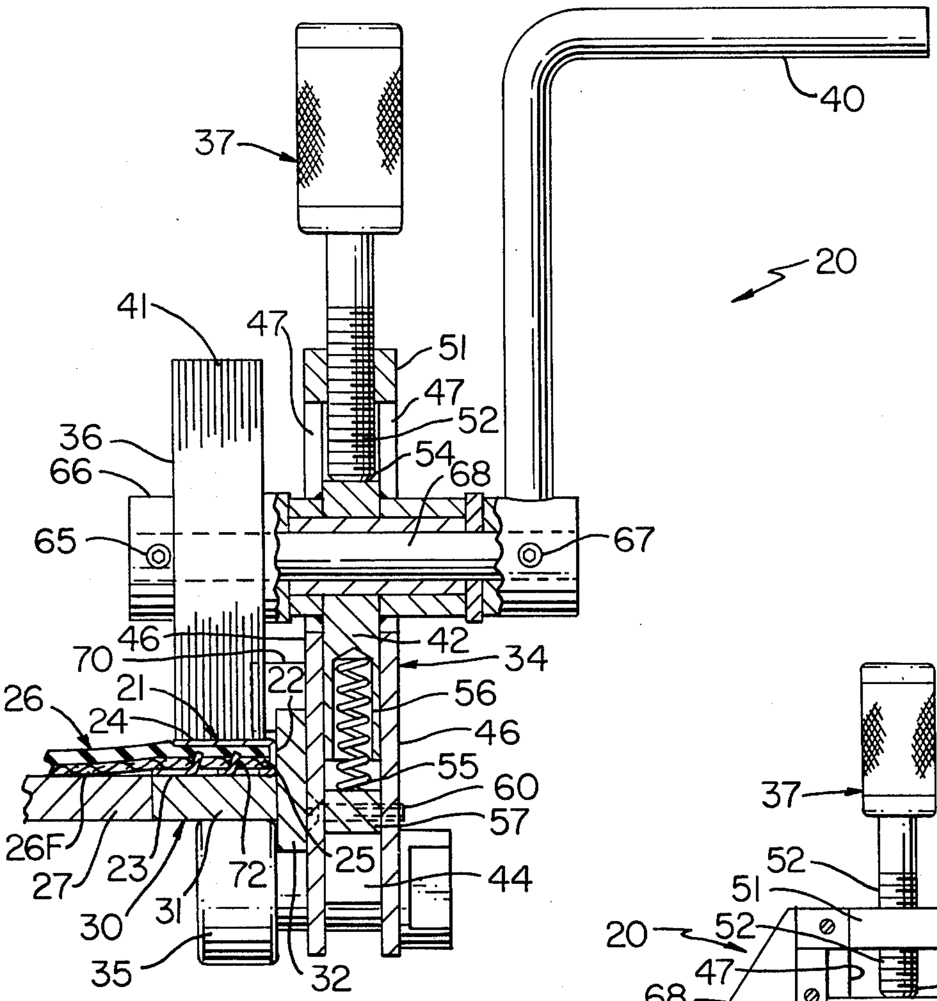
FIG. 4 is a view with parts in cross section, parts in elevation, and parts broken away taken essentially on the line 4—4 of FIG. 1 and drawn to an enlarged scale.

As will be readily apparent from FIG. 4 of the drawing the device 20 comprises a shaft 68 which is rotatably carried by the carrier 42 and the shaft has the pressure roller 36 suitably fixed thereto for rotation therewith by a set screw 65. The set screw 65 extends through a flange portion 66 of the roller 36. It will also be seen that the shaft 68 has the hand crank 40 suitably fixed to the rear portion thereof and a set screw 67 is employed for this purpose. The set screws 65 and 67 extend through threaded openings in the flange portion 66 and hand crank 40 respectively and to engagement with the shaft 68 as is well known in the art.

The means for moving the device 20 relative to the bar 21 is thus in the form of the hand crank 40 whereby with the pressure roller 36 engaging the holding bar and during rotation thereof by the crank 40 the device is moved along the bar 21.

The device 20 also has guiding means for guiding movement thereof along the bar 21 and such guiding means in this example comprises a pair of roughly L-shaped guides each designated by the same reference numeral 70. The guides 70 are fixed by threaded screws 71 to the forward one of the plates 46 and the L-shaped guides are adapted to engage the top portion of the slide plate 31 which defines the crossarm portion 32 of the rail 30. The L-shaped guides 70 slidably engage the upper portion of the plate 31 and allow the device 20 to slide therealong as the pressure roller engages and deforms the top leg 24 of the holding bar downwardly toward the other leg 25 of such holding bar so that triangular barb-like tangs 72 defined as an integral part of the bar 21 pierce through the fabric portion 26F of the blanket 26 and simultaneously the legs 23 and 24 of the holding bar are disposed in substantially parallel relation.

The hand portable device 20 of this invention provides fastening of a holding bar on a printing blanket, or the like, in a simple and efficient manner yet without requiring utilization of massive equipment such as presses or the like whereby holding bars may be installed easily and inexpensively by comparatively unskilled operators.

Figure 6:
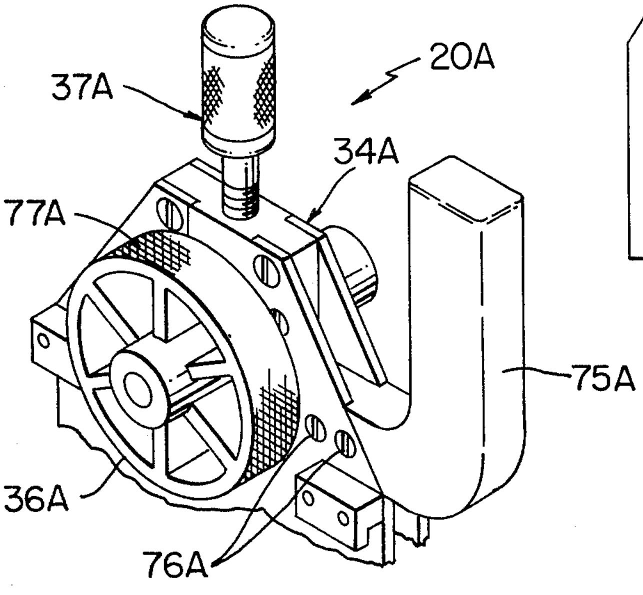
FIG. 6 is a view similar to the upper portion of FIG. 1 illustrating a modification of the device of this invention.

Another exemplary embodiment of the device of this invention is illustrated in FIG. 6 of the drawings. The device illustrated in FIG. 6 is a very similar to the device 20; therefore such device will be designated generally by the reference numeral 20A and parts of the device 20A which are very similar to the corresponding parts of the device 20 will be designated by the same reference numerals as the device 20 also followed by the letter designation A and not described again in detail. Only those component parts which are different from corresponding parts of the device 20 will be designated by a new reference numeral also followed by the letter designation A and described in more detail.

The main difference between the device 20 and the device 20A is in the means for relatively moving such device with respect to a holding bar which is to be attached at the end of a printing blanket. In particular, such means for relatively moving comprises a handle 75A which is suitably fixed by fasteners 76A to the frame structure and is adapted to be used to move the device 20A along the holding bar with the pressure wheel 36A thereof rotating due to its pressure engagement of an associated holding bar during movement of the device 20A along such holding bar. Another difference between the device 20 and the device 20A is the provision of a knurled outside surface 77A on the pressure wheel 36A which provides more positive nonslipping engagement with an associated holding bar during installation thereof on a printing blanket. With these exceptions the device 20A and the device 20 are substantially identical.

Each device 20 and 20A may be employed in carrying out the simple method of this invention of fastening a holding bar on a printing blanket and in using the device 20, for example, it will be seen that the method comprises the steps of disposing the end portion 25 of the printing blanket 26 between the diverging legs 23 and 24 of the holding bar 21 with the bar supported on rail 30 against the plate 31 and with the blanket 26 on the table 27. The device 20 is then placed in position with the pressure roller 36 against the top leg 24 of the bar 21 and with the backup rollers 35 disposed outwardly of the other of the legs and in this example with the two backup rollers 34 are disposed outwardly and against the bottom surface of the rail 30 which supports the bottom leg 23 of the holding bar 21.

The method then comprises the step of relatively moving the hand portable device and bar causing the pressure roller 36 to relatively urge the one leg shown as the top leg 24 toward the other and thereby progressively deform the bar 21 along its entire length into positive engagement against the end portion 25 of the blanket. During relative movement the guide means or spaced L-shaped guides 70 engage the crossarm or plate 31 and guide the device 20 during relative movement so that the pressure wheel moves in a rectilinear path along the bar 21.

Relative movement in this example is achieved by holding the blanket 26 and bar 21 stationary and by rotating the hand crank 40 to provide progressive deformation along the bar 20; however, it will be appreciated that the relative movement is achieved in the modified device 20A of FIG. 6 by pulling the handle 75A provided for this purpose.

The holding bar 21 or similar bar may be made of any suitable metallic material or materials, Preferably the holding bar is made of an easily deformable metallic material such as steel or aluminum, for example. Further, it will be appreciated that the holding bar may be of any suitable construction and reference is made to U.S. Pat. No. 3,883,940, for example, for a showing of other similar holding bars.

While present exemplary embodiments of this invention, and methods of practicing the same, have been illustrated and described, it will be recognized that this invention may be otherwise variously embodied and practiced within the scope of the following claims.

I claim:

1. A hand portable device for fastening a holding bar on a printing blanket; said holding bar having a bight and a pair of legs diverging from opposite ends of said bight; said device comprising, a frame structure, a backup roller rotatably mounted on said frame structure, a pressure roller carried by said frame structure for rotation relative thereto and in spaced relation from said backup roller, an adjustable stop means for controlling the maximum spacing between said pressure roller and backup roller, a carrier supporting said pressure roller, means supporting said carrier and pressure roller for sliding movement toward and away from said backup roller, horizontal support means mounted on said frame structure for supporting said printing blanket and holding bar, and means for relatively moving said device and bar with said pressure roller relatively urging said legs toward each other with an end portion of said blanket disposed between said legs to thereby progressively deform at least one of said legs along its entire length into clamping engagement against said end portion of said blanket.

2. A device as set forth in claim 1 in which said adjustable stop is a stop screw threadedly received in said frame structure and having an exposed end portion, said exposed end portion being adapted to be engaged by said carrier to limit the movement thereof away from said backup roller.

3. A device as set forth in claim 1 and further comprising means yieldingly urging said carrier against said adjustable stop.

4. A device as set forth in claim 3 in which said means yieldingly urging comprises mechanical spring means.

5. A device as set forth in claim 1 and further comprising another backup roller rotatably mounted on said frame structure in spaced relation from said first-named backup roller, said backup rollers having their axes arranged in a common plane and said means supporting said carrier and pressure roller supporting the same for movement perpendicular to said common plane.

6. A device as set forth in claim 5 in which said backup rollers have their axes disposed in said common plane an equal distance from a plane perpendicular thereto which contains the axis of said pressure roller.

7. A device as set forth in claim 6 and further comprising guiding means for said device during relative movement thereof along said bar.

8. A device as set forth in claim 7 in which said guiding means comprises an L-shaped guide adapted to engage a slide plate of a table which supports said printing blanket.

9. A device as set forth in claim 1 and further comprising a shaft rotatably carried by said carrier, said shaft having said pressure roller fixed thereto for rotation therewith, and said means for relatively moving comprises means for rotating said shaft during engagement of said pressure roller against said holding bar.

10. A device as set forth in claim 9 in which said means for rotating comprises a hand crank.

11. A device as set forth in claim 9 in which said means for relatively moving comprises a handle fixed to said frame structure and being adapted to be used to move said device along said holding bar with said pressure wheel rotating due to its engagement of said holding bar and with movement of said device along said holding bar.

12. A device as set forth in claim 1 in which said pressure roller has a knurled right circular cylindrical surface which is adapted to engage said holding bar.

13. A method of fastening a holding bar on a printing blanket wherein said holding bar has a bight and a pair of legs diverging from opposite ends of said bight; said method comprising the steps of; disposing an end portion of said printing blanket between said diverging legs of said holding bar; laying said blanket on a horizontal table which has a roughly T-shaped rail structure defining an edge thereof; placing said bar with its bight against a vertically disposed crossarm of said T-shaped rail structure; providing a hand portable device comprising, a frame structure, at least one backup roller rotatably mounted on the frame structure, a carrier slidably carried by said frame structure for movement toward and away from said backup roller, and a pressure roller rotatably supported by said carrier; placing said pressure roller against one of said legs of said bar with said backup roller disposed outwardly of the other of said legs of said bar; relatively moving said hand portable device and bar causing said pressure roller to relatively urge said one leg toward the other to thereby progressively deform said bar along its entire length into positive engagement against said end portion of said blanket, and guiding said device using guiding means thereon in engagement with said crossarm during relatively moving step.

14. A method as set forth in claim 13 in which said relatively moving step comprises rotating said pressure roller.

15. A method as set forth in claim 13 in which said relatively moving step comprises pulling said device with a stationary handle thereof which is fixed on said frame structure and which causes rotation of said pressure wheel due to its engagement of said holding bar during movement of said device along said holding bar.

16. A method as set forth in claim 13 and comprising the further step of slidably adjusting said carrier toward said backup roller to thereby control the magnitude of pressure exerted against said one leg and the deformation of said leg.

17. A method as set forth in claim 13 in which said relatively moving step comprises holding said blanket and said holding bar stationary while moving said device along said bar.

* * * * *